United States Patent
Mettry et al.

(10) Patent No.: US 12,410,282 B2
(45) Date of Patent: Sep. 9, 2025

(54) TRANSPARENT POLYMER AEROGELS

(71) Applicant: Lawrence Livermore National Security, LLC, Livermore, CA (US)

(72) Inventors: Magi Mettry, Livermore, CA (US); Tyler Martin Fears, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 711 days.

(21) Appl. No.: 17/711,971

(22) Filed: Apr. 1, 2022

(65) Prior Publication Data
US 2023/0312829 A1    Oct. 5, 2023

(51) Int. Cl.
*C08G 73/10*    (2006.01)
*C08J 3/11*    (2006.01)
*C08J 3/24*    (2006.01)

(52) U.S. Cl.
CPC ............ *C08G 73/1067* (2013.01); *C08J 3/11* (2013.01); *C08J 3/24* (2013.01); *C08J 2379/08* (2013.01)

(58) Field of Classification Search
CPC ............ C08G 73/1067; C08J 3/24; C08J 3/11
See application file for complete search history.

(56) References Cited

U.S. PATENT DOCUMENTS

| | | | |
|---|---|---|---|
| 2015/0111976 A1* | 4/2015 | Leventis | C08J 9/286 521/64 |
| 2018/0084853 A1* | 3/2018 | Markesbery | A41D 31/06 |
| 2021/0115214 A1* | 4/2021 | Ejaz | B01J 13/0091 |

OTHER PUBLICATIONS

Shen et al., "Solvent Vapor Strengthened Polyimide Nanofiber-Based Aerogels with High Resilience and Controllable Porous Structure," ACS Applied Materials & Interfaces, vol. 12, 2020, pp. 53104-53114.
Vivod et al., "Toward Improved Optical Transparency of Polyimide Aerogels," ACS Applied Materials & Interfaces, vol. 12, 2020, pp. 8622-8633.
Li et al., "Polyimide Aerogel Fibers with Superior Flame Resistance, Strength, Hydrophobicity, and Flexibility Made via a Universal Sol?Gel Confined Transition Strategy," ACS Nano, vol. 15, 2021, pp. 4759-4768.
Chidambareswarapattar et al., "One-step room-temperature synthesis of fibrous polyimide aerogels from anhydrides and isocyanates and conversion to isomorphic carbons," Journal of Materials Chemistry, vol. 20, 2010, pp. 9666-9678.
Hou et al., "Polyimide Aerogel Membranes with Adjustable Transparency and High Flexibility for Highly Efficient Solar Thermal Collection," ACS Sustainable Chemical Engineering, 2021, 9, pp. 7638-7648.
Pekala et al., "Aerogels derived from multifunctional organic monomers," Journal of Non-Crystalline Solids, vol. 145, 1992, pp. 90-98.
Nguyen et al., "Effect of Urea Links in the Backbone of Polyimide Aerogels," ACS Applied Polymer Materials, vol. 3, 2021, pp. 2027-2037.
Meador et al., "Dielectric and Other Properties of Polyimide Aerogels Containing Fluorinated Blocks," ACS Applied Materials & Interfaces, Vol. 6, 2014, pp. 6062-6068.
Guo et al., "Solvent-free and photocurable polyimide inks for 3D printing," Journal of Materials Chemistry A, vol. 5, 2017, pp. 16307-16314.

* cited by examiner

*Primary Examiner* — Gregory Listvoyb
(74) *Attorney, Agent, or Firm* — Zilka-Kotab, P.C.

(57) ABSTRACT

A product includes a polymer aerogel. The aerogel is physically characterized by having a transparency greater than or equal to 90% transmission of visible light through a 3 mm thickness of the aerogel. The aerogel includes at least one oligomer selected from the group consisting of: a polyamide, a polyimide, a polyacrylate, a polyvinyl, and a polythioether. A method includes dissolving at least one monomer in at least one solvent to form a mixture and causing polymerization of the at least one monomer to form at least one oligomer. The method also includes causing crosslinking of the at least one oligomer, initiating gelation of a product of the crosslinking and the at least one solvent to form an aerogel precursor; and forming an aerogel from the aerogel precursor.

18 Claims, 7 Drawing Sheets

| | Crosslinker (melamine) | Measured Density | Shrinkage | BET surface area | Young's modulus | Transmission at 750 nm | TG |
|---|---|---|---|---|---|---|---|
| | mole equiv. | (g/cm³) | (%) | (m²/g) | (kPa) | (%) | (°C) |
| 1 | 0.01 | 0.0791±0.0045 | 8% | 616.70 | 281 | 92 | 420 |
| 2 | 0.02 | 0.0826±0.0014 | 21% | 619.93 | 389 | 88 | 320 |
| 3 | 0.03 | 0.0874±0.0026 | 7% | 794.05 | 473 | 95 | 430 |
| 4 | 0.05 | 0.0886±0.0023 | 16% | 480.09 | 499 | 81 | 440 |
| 5 | 0.10 | 0.0866±0.0071 | 18% | 638.13 | 539 | 94 | 450 |
| 6 | 0.15 | 0.0740±0.0005 | 24% | 690.56 | 308 | 91.75 | 440 |

FIG. 4

| Entry | Polymer Concentration (mg/mL) | Apparent Density (g/cm³) | BET surface area (m²/g) | Young's modulus (kPa) | Transmission at 750 nm (%) | TG (°C) |
|---|---|---|---|---|---|---|
| 7 | 92 | 0.0663±0.0019 | 688.392 | 312.25 | 95 | 400 |
| 3 | 132 | 0.0874±0.0026 | 794.054 | 472.705 | 95 | 430 |
| 8 | 154 | 0.1032±0.0025 | 659.755 | 1085.59 | 88 | 400 |
| 9 | 231 | 0.1477±0.0054 | 771.460 | 1781.39 | 92 | 400 |
| 10 | 265 | 0.1498±0.0057 | -- | 1257.14 | 92 | 420 |

FIG. 5

| | Solvent Polarity Variant | Apparent Density (g/cm³) | Shrinkage (%) | BET surface area (m²/g) | Young's modulus (kPa) | Transmission at 750 nm (%) | Thermal Conductivity (mW/mK) |
|---|---|---|---|---|---|---|---|
| 3 | 0% toluene | 0.0869 | 7% | 794.05 | 472.70 | 95 | 38.848±28x10-5 |
| 11 | 10% toluene | 0.0888 | 9% | 538.90 | 276.37 | 77 | 45.87±1.6079x10-4 |
| 12 | 25% toluene | 0.0918 | 20% | 641.66 | 600.34 | 66 | |
| 13 | 50% toluene | 0.1042 | 24% | 592.88 | 737.12 | 36 | 46.50 |

FIG. 6

TRANSPARENT POLYMER AEROGELS

This invention was made with Government support under Contract No. DE-AC52-07NA27344 awarded by the United States Department of Energy. The Government has certain rights in the invention.

FIELD OF THE INVENTION

The present invention relates to aerogels, and more particularly, this invention relates to transparent polymer aerogels.

BACKGROUND

Aerogels are a diverse class of bottom-up porous materials. Aerogels are conventionally characterized by very high internal surface area, nanostructured porosity, and very low density (e.g., <10% std) and are usually fabricated via supercritical drying. Various aerogels exhibit a variety of unique and desirable material properties. Silica is the prototypical aerogel material and has been studied extensively; however, aerogels have been made from a vast array of materials, including metal oxides, carbon nanoparticles, inorganic colloids, and polymers with few limits on composition.

SUMMARY

A product, according to one embodiment, includes a polymer aerogel. The aerogel is physically characterized by having a transparency greater than or equal to 90% transmission of visible light through a 3 mm thickness of the aerogel. The aerogel includes at least one oligomer selected from the group consisting of: a polyamide, a polyimide, a polyacrylate, a polyvinyl, and a polythioether.

A method, according to another embodiment, includes dissolving at least one monomer in at least one solvent to form a mixture and causing polymerization of the at least one monomer to form at least one oligomer. The method also includes causing crosslinking of the at least one oligomer, initiating gelation of a product of the crosslinking and the at least one solvent to form an aerogel precursor, and forming an aerogel from the aerogel precursor.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 4 is a table of data of physical and mechanical properties of exemplary polymer aerogels, and particularly exemplary polyimide aerogels with variations in crosslinker concentration, in accordance with one aspect of the present invention.

FIG. 5 is a table of data of physical and mechanical properties of exemplary polymer aerogels, and particularly exemplary polyimide aerogels with variations in polymer concentration, in accordance with one aspect of the present invention.

FIG. 6 is a table of data of physical and mechanical properties of exemplary polymer aerogels, and particularly exemplary polyimide aerogels with variations in solvent composition, in accordance with one aspect of the present invention.

DETAILED DESCRIPTION

Figure 1:
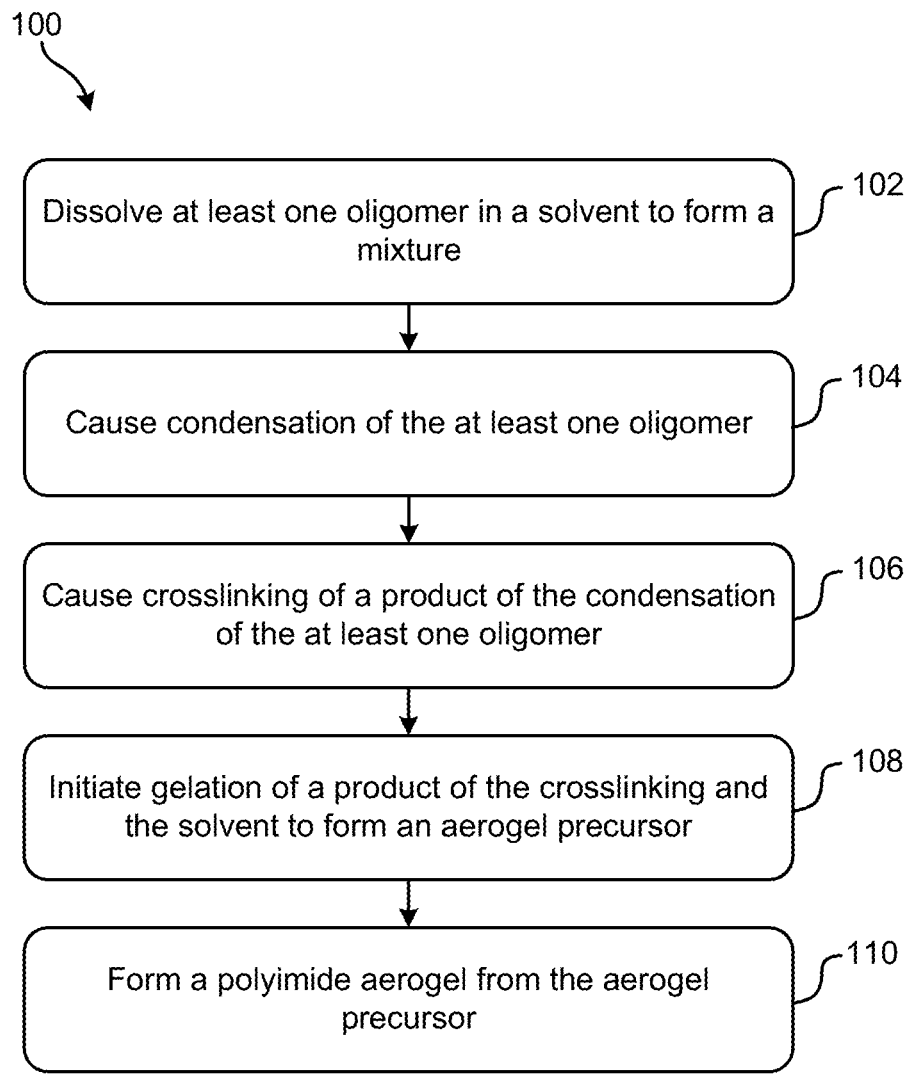
FIG. 1 is a flowchart of a method, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of transparent polymer aerogels and/or related systems and methods.

In one general embodiment, a product includes a polymer aerogel. The aerogel is physically characterized by having a transparency greater than or equal to 90% transmission of visible light through a 3 mm thickness of the aerogel. The aerogel includes at least one oligomer selected from the group consisting of: a polyamide, a polyimide, a polyacrylate, a polyvinyl, and a polythioether.

In another general embodiment, a method includes dissolving at least one monomer in at least one solvent to form a mixture and causing polymerization of the at least one monomer to form at least one oligomer. The method also includes causing crosslinking of the at least one oligomer, initiating gelation of a product of the crosslinking and the at least one solvent to form an aerogel precursor; and forming an aerogel from the aerogel precursor.

Aerogels have many practical applications. There are three major aerogel materials (e.g., silica, carbon, and metal oxides), with silica aerogels being the most common type and most extensively used. This is due to the high optical transparency, low density, and low thermal conductivity which make silica aerogels suitable to be used for supercapacitors, water deionizers, sensors for gas detection, aerospace applications, oil and gas industry applications, etc. However, silica aerogels provide limited ability to tune the surface chemistry of the materials and tend to be extremely brittle.

"Transparent" as used throughout the present disclosure refers to a material having greater than or equal to 80% transmission of 633 nm light through a 3 mm thickness of the material (e.g., the 3 mm path length where the "thickness" is in the direction parallel to the light passing through the material unless otherwise specified herein), unless otherwise noted herein. "Highly transparent," especially with respect to the formed aerogels described herein, refers to a material having about 90% to 100% transmission of "human" visible light through a 3 mm thickness of the material, unless otherwise noted herein. "Translucent" as referred to herein refers to a material having about 50% to about 89% transmission of visible light through a 3 mm thickness of the material. "Opaque" as referred to herein may include material having less than or equal to 49% transmission through a 3 mm thickness of the material. Translucent and opaque are to be considered "less transparent" than the general transparency described above. As used throughout the present disclosure, transparency levels referred to herein generally refer to light scattering (e.g., as opposed to absorption) properties, unless otherwise noted herein.

Polymeric aerogels combine the useful properties of aerogels, e.g., high surface area, low density, etc., with the unique properties of their polymeric constituents, e.g., high strength, elasticity, shape memory, chemical reactivity, etc., resulting in materials having unique combinations of properties for complex applications. For example, polystyrene, polyvinyl alcohol, and polyacrylonitrile may be used in and/or with polymeric aerogels for absorption of volatile organic compounds such as dyes and oils. In another example, polyurea and polybenzoxazine may be used in and/or with polymeric aerogels to create materials having high mechanical performance for uses such a shielding in aerospace applications. One downside polymeric aerogels have compared to their metal oxide counterparts, is a low thermal stability due to the underlying chemistry of the polymeric backbone. In addition, conventional polymeric aerogels also tend to be opaque, as the feature sizes (e.g., primary particles, secondary particles, pores, etc.) are usually much larger than their photogenic silica counterparts and the larger feature sizes scatter light much more strongly.

Polyimides (PI) are a family of polymers typically characterized by high thermal stability and deflection temperatures between 400° C. and 520° C., excellent chemical resistance, low permittivity (e.g., Er between about 3 and 6), low coefficient of thermal expansion (CTE) between $9 \times 10^6$ and $6 \times 10^5$ $K^{-1}$, and high mechanical strength. Porous materials inherit the properties of the constituent polymer, contributing to PI aerogels use commercially as thermal insulators, catalyst supports, and filtration devices.

Aromatic polyimide (PI) aerogels have been synthesized by gelation of chemically imidized polyimides in dilute solutions of <10 wt % using classic reactions such as pyromellitic dianhydride (PMDA) and 4,4'-methylenedianiline (MDA) followed by supercritical drying. However, aromatic PI aerogels often undergo significant shrinkage (up to 40%) and lack optical clarity. In attempt to improve thermal stability and minimize shrinking, other PI aerogels have been synthesized by cross-linking anhydride capped polymeric acid oligomers through aromatic triamines, including silsesquioxane (OAPS), 1,3,5-triaminophenoxybenzene (TAB), and 1,3,5-benzenetricarbonyl trichloride (BTC), to improve thermal stability and minimize shrinking. However, these monolithic PI aerogels are generally opaque with pores having an average diameter of >20 nm.

Judicious modification of the chemical structure of the PI chain used in an aerogel may be used to subtly modify material properties. For example, a highly aromatic backbone results in high thermal and mechanical stability due to strong chemical bonds and the rigid-linear structure. Aliphatic and fluorinated constituents impart lower dielectric constants, hydrophobic properties, and flexibility due to the high degrees of rotational freedom in aliphatic linkers. Bulkier monomers introduce steric effects which interrupt conjugation along the molecular chain, reducing color intensity and leading to an increase in optical transparency to 70%. The reduction in color intensity is attributed to formation of a charge transfer complex between alternating electron-poor donor (e.g., $CF_3$ containing diamine) and weak electron acceptor (e.g., dianhydride) moieties. However, the primary barrier to transparency remains optical scattering from comparatively large feature sizes. Sacrificing continuous conjugation due to the $CF_3$ substitution also results in a reduction in stiffness and the overall lower mechanical modulus of 29-75 MPa.

Various aspects of the present disclosure produce transparent PI aerogels by minimizing pore size and producing fiber-like oligomers to reduce particle size by exploiting highly strained starting materials with high polymer concentration. For example, at least some aspects of the present disclosure use highly strained diamines 2,2'-Dimethyl-4,4'-diaminobiphenyl (DMBZ) and 3,3',4,4'-Benzophenonetetracarboxylic dianhydride (BPDA) for a step growth condensation followed by crosslinking with melamine and imidization with pyridine and acetic anhydride to produce highly transparent (e.g., between about 85% to 95% transmission across the visible spectrum for a 3 mm thickness) PI aerogels. The high transparency of PI aerogels is attributed to exceptionally small feature sizes and the resulting fiber like morphology below 10 nm in diameter. For example, the aerogels presented herein ideally comprise fibrous ligaments (fibers) having an average diameter less than or equal to 10 nm and pores having an average diameter less than or equal to 20 nm. The pore size, pore volume, bulk density, opacity, etc., are controllable by modifying the monomer concentration and/or solvent composition. The use of a highly polar solvent and a comparatively high polymer concentration (e.g., greater than 3 wt %) prevents phase separation of the polymer prior to gelation, resulting in a percolating network of small unimolecular fibers, thereby minimizing optical scattering. "Unimolecular" refers to fibers that are a single molecule wide, rather than being composed of multiple polymer chains aggregated into a "thread," as is typical for other polymer aerogels with fibrous morphologies. The rigidity of the aromatic oligomers prevents self-aggregation (e.g., coiling) of individual polymer fibers which can also contribute to phase separation and an increase in particle size.

At least some aspects disclosed herein modify the porosity, bulk density and opacity of the aerogels by modifying the solvent composition and solvent concentration by introducing a nonpolar solvent (e.g., toluene) to induce solvent phase separation resulting in polymer collapse into multimolecular strands, bundles, coils, etc., thereby increasing feature size (e.g., pore size) and inducing optical scattering. Furthermore, the fully conjugated polymer backbone exhibits excellent mechanical properties, deforming plastically under high stress to >90% strain, with tunable stiffness controlled by crosslinker content.

At least some aspects of the present disclosure describe a controllable porosity polyimide aerogel system resulting in a high surface area (e.g., greater than or equal to 600 $m^2/g$) and high transparency (e.g., greater than 95% transparent for a greater than or equal to 3 mm thickness). Previous polyimide aerogels are only able to achieve 90% transparency in materials having a thickness of less than 2 mm in at least one direction (e.g., conventional aerogels are limited in achieving reaching high transparency by relatively thin materials compared to those achievable via at least some of the aspects described herein). Without wishing to be bound to any theory, it is presently believed that the level of transparency is due to the average pore size and/or average feature sizes achievable by various aspects described herein. The aerogel minimizes phase separation thereby yielding submicron features resulting in low light scattering and high optical transparency comparable to Si-aerogel counterparts. The resulting exemplary aerogels comprise a fully conjugated polyimide backbone, resulting in a high modulus (e.g., greater than or equal to 1 MPa), and low thermal conductivities (e.g., less than 38 mW/mK) comparable to commercial fire retardant insulation materials. Chemical changes to the polymer backbone (e.g., crosslinking, aliphatic vs. aromatic oligomers) may affect material properties such as stiffness, degradation temperature, chemical reactivity, and color, while morphological changes (e.g., pore size, ligament size, hierarchical porosity, etc.) may affect material properties such as stiffness, thermal conductivity, surface area, optical scattering, etc. Though the chemical structure of the oligomer (and resulting polymer) has an effect on phase separation which determines the final morphology of the aerogel, a judicious choice of reaction conditions (e.g., solvent, oligomer units, catalyst concentration, etc.) can be determined by one skilled in the art to independently tune the chemical and morphological properties of the final product, and as a result, the final material properties.

FIG. 1 shows a method 100 for forming an aerogel, in accordance with one embodiment. As an option, the present method 100 may be implemented to construct materials, structures, devices, such as those shown in the other FIGS. described herein. Of course, however, this method 100 and others presented herein may be used to form materials for a wide variety of devices and/or purposes, and/or provide applications which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

Method 100 includes operation 102 which includes dissolving at least one monomer in at least one solvent to form a mixture. In at least some approaches, at least two different monomers are dissolved in the at least one solvent to form a mixture. In preferred aspects, the monomer is a diamine, a triamine, a polyamine, a dianydride, a diisocyanate, a polyisocyanate, a multifunctional carboxylate, etc. For example, a diamine monomer may include, but is not limited to, phenylene diamine, benzidine, tolidine, 4,4'-methylene-dianiline, 4,4'-oxydianiline, etc. In another example, an anhydride monomer may include, but is not limited to, pyromellitic dianhydride, benzophenone-3,3',4,4'-tetracarboxylic dianhydride, 4,4'-oxydiphthalic anhydride, etc. In some approaches, the at least one solvent may be a polar solvent which may include an amide, an imide, an ether, an ester, a carboxylic acid, an alcohol, an amine, water, etc. In other approaches, the at least one solvent is a nonpolar solvent which may include an aromatic hydrocarbon, an aliphatic hydrocarbon, a halogenated hydrocarbon, an ethers an amphiphilic solvent, etc.

In various approaches, monomer(s) may be dissolved in a plurality of solvents. The solvent(s) may be chosen for tuning the feature size (e.g., thereby tuning the transparency). For example, in preferred aspects, a poor (e.g., unfavorable), nonpolar solvent may include octane, toluene, xylene, etc., and the nonpolar solvent may be added to induce premature phase separation (e.g., to increase feature size and decrease transparency). The choice of good (e.g., favorable) and poor solvents to control polymer phase separation is specific to oligomer composition and not limited to the use of a mixture of polar and nonpolar solvents as good and poor solvents, respectively. This concept can be generalized beyond cosolvents to include other excipients, which are additives which do not play an active role in the polymerization reaction but modify polymer-solvent interaction (e.g., phase separation in the mixture). Example excipients include polystyrene, polyethylene glycol, potassium acetate, potassium perchlorate, etc.

Operation 104 includes causing polymerization of the at least one monomer to form at least one oligomer. In various approaches, the oligomer includes polyamide, polyimide, polyacrylate, polyvinyl, polythioether, etc. In preferred aspects, the oligomer is a linear aromatic polyamide composed of diamine and dianhydride subunits (e.g., monomers). In some aspects, operation 104 may include synthesis of polyamide oligomers via condensation of at least one diamine monomer with at least one dianhydride monomer. In preferred aspects using polyamide oligomers, the solvent is a good, polar solvent including N-methylpyrrolidone (NMP), N-vinylpyrrolidone, dimethylsulfoxide, etc. Performing the condensation reaction may include adding an anhydride to the dissolved diamine in the solvent (e.g., the polar solvent or the mixture of polar/nonpolar solvents). The addition of the anhydride initiates a condensation reaction in the mixture, forming an amide and/or imide oligomer. In preferred aspects, the mixture is stirred for an effective amount of time to ensure a homogeneous interaction between the diamine and the anhydride, e.g., about 3 minutes in one exemplary approach.

Operation 106 includes causing crosslinking of the at least one oligomer. Crosslinking the at least one oligomer is effected, in some aspects, by adding a triamine to anhydride end-capped polyamide oligomers. The triamine provides the end cap that crosslinks the product of the condensation of the at least one oligomer, as would be understood by one having ordinary skill in the art. The triamine may include, but is not limited to, aromatic triamines such as benzene triamine, melamine, 5-ethylpyrimidine-2,4,6-triamine, etc., and aliphatic triamines such as diethylenetriamine, pentane-1,3,5-triamine, etc. Dendritic and linear polyamines such as polyethyleneimine (PEI) may also serve as suitable crosslinkers. In preferred aspects, the mixture is stirred for an effective amount of time to provide adequate crosslinking, prior to gelation, e.g., about 7 minutes in one exemplary approach. During the crosslinking, spherical and/or fibrous aggregates may form as part of a phase separation process. The size of the beads and/or fibers is tunable based on the composition of the oligomer and/or the solvent (e.g., controlling the identity of the oligomer and/or the solvent, controlling the concentration of the oligomer and/or the solvent, etc.).

Operation 108 includes initiating gelation of a product of the crosslinking and the at least one solvent to form an aerogel precursor. In various aspects, the gelation is initiated by adding acetic anhydride and a weak base (e.g., pyridine) for finishing the condensation of reaction of the polymer, converting the soluble amide to insoluble imide. The concentration of the acetic anhydride may be modified to affect the gelation rate of the material, in a manner which would be determinable by one having ordinary skill in the art. For example, the gelation time may be in a range between about 10 minutes to about 7 hours depending on the concentration of the acetic anhydride, as would become apparent to one having ordinary skill in the art upon reading the present disclosure. In other approaches, gelation may be initiated by light induced polymerization using techniques known in the art. In other approaches, crosslinking may be sufficient to induce gelation.

In various approaches, the gelation is initiated by imidization of the product of the crosslinking. The imidization may be initiated chemically by the addition of the (excess) anhydride in some approaches. In other approaches, the imidization is initiated by heating the product of the crosslinking (e.g., by heating the sol, wet gel, dried aerogel, etc.).

Operation 110 includes forming an aerogel from the aerogel precursor. Operation 110 may include processing the aerogel via standard aerogel processing procedures known to one skilled in the art, including solvent exchange to remove unwanted reaction residues and replace the reaction solvent with one suitable for the chosen drying procedure. In various preferred aspects, the formed aerogel is a polyimide aerogel, a polyamide aerogel, a carbon-based aerogel, etc. Operation 110 may include at least partially submerging the aerogel precursor in at least one NMP bath to remove any unreacted material. In further aspects, the aerogel precursor may be at least partially submerged in at least one acetone bath to replace the pore volume with acetone. In one aspect, baths of solvent mixtures may be used to minimize pore collapse, as would be determinable by one having ordinary skill in the art. Subsequent supercritical CO2 drying may be performed from acetone to dry out the aerogel (e.g., remove substantially all of the remaining solvent which is trapped inside of the aerogel precursor), in a manner known in the art. NMP and acetone are used here as example solvents and can be replaced by any appropriate solvent known to one skilled in the art. Supercritical CO2 drying is commonly employed to convert wet gels to aerogels, but other drying procedures known to one skilled in the art, e.g., subcritical drying, benchtop drying, etc., can be used without loss of generalization of this procedure.

In various aspects, the foregoing operations of method 100 are performed with oligomer concentrations less than or equal to 30 wt % of the solvent. In other aspects, the foregoing operations of method 100 are performed with oligomer concentrations less than or equal to 25 wt % of the solvent. In preferred aspects, the solvent is present in the mixture in an effective amount to prevent phase separation of the mixture during the dissolving and the crosslinking, and prior to gelation. The effective amount of solvent may depend upon the components (e.g., the oligomer(s)) and processing conditions used in a given approach. The effective amount of solvent would be readily determinable, without undue experimentation, by one skilled in the art once being apprised of the present description.

The difference in the molar ratio of the triamine may be modified to tune the density and/or the strength of the backbone of the resulting material, in a manner which would be determinable by one having ordinary skill in the art. The stiffness of the material (e.g., the strength of the backbone) increases with a higher concentration of the crosslinker material (e.g., the triamine). In preferred aspects, the reaction is performed in a high concentration (>10 wt %) of the polymer to the solvent to minimize the fiber collapsing and/or deflating of the pores and increase transparency.

According to various aspects, the phase separation following the crosslinking is controllable to tune the resulting nanostructure in the aerogel. The formed material is physically characterized as having substantially uniform feature sizes which are less than or equal to 20 nm in at least one direction (e.g., an average diameter). Specifically, the formed material is physically characterized as having pore sizes which are less than or equal to 20 nm in at least one direction (e.g., an average diameter). In materials without well-defined pores, "pore size" is understood to refer to interparticle spacing. The small feature sizes result in the material being physically characterized as being a homogenous, transparent material. Specifically, smaller feature sizes minimize light scattering which would otherwise lead to opaque materials. Translucent materials with intermediate levels of light scattering appear smoky by eye, though structural color, e.g., from the Tyndall effect, can also result. Conventional polymer aerogels cannot achieve the aforementioned feature sizes, and the presence of relatively large features (e.g., between about 100 nm and 10 µm) result in significant light scatter and opacity.

In at least some aspects, the formed material is physically characterized as having a thermal conductivity in a range between about 38 and about 46 mW/mK.

In various aspects, the aerogel may be combined with other components to create a product. The aerogel, being a component of a product, according to various approaches, may have a thickness greater than or equal to 10 microns in at least one direction. Forming the aerogel may include molding the mixture (e.g., the aerogel precursor). Molding the mixture may include covering the mold comprising the aerogel precursor to eliminate and/or significantly reduce any solvent evaporation and leaving the mold for about 24 hours without interruption, in one aspect. In other approaches, forming the aerogel may include 3D printing techniques, including: extrusion, direct ink writing, photo active printing, thermal printing, ink jetting, etc., of the aerogel precursor to form the aerogel. In yet other approaches, forming the product may include casting the mixture, e.g., including molding, spin coating, doctor blading, continuous roll-to-roll, etc.

In at least some aspects, the aerogel may include a graded composition and/or have a gradient in transparency along at least a portion thereof, e.g., via layered deposition or casting one formulation around a gel of a different formulation. For example, the product having a transparency gradient may be relatively more transparent at a first end region thereof, transitioning gradually or abruptly to a more translucent mid-region (e.g., relatively less transparent relative to the first end) if present, and transitioning gradually or abruptly to a second end region of the aerogel that is relatively less transparent compared to the mid-region (e.g., transitioning to substantially opaque in some approaches), or vice versa. In another approach, a central region of the aerogel may have a relatively higher transparency than a surrounding portion of the aerogel, e.g., as in a bullseye configuration. As should now be apparent, regions of relatively higher and relatively lower transparency (e.g., different transparencies) may be arranged in any desired fashion. By analogy, gradients in, e.g., chemical functionality, stiffness, thermal conductivity, etc., can be created.

In some approaches, different phases of the same chemical composition may be used to create a gradient in transparency in the formed product. In other approaches, the final product comprises different transparencies in defined portions (e.g., regions) and/or layers of the product. A product having a plurality of, e.g., transparencies may be formed via 3D printing subsequent mixtures of different compositions along the product, following the crosslinking step of the methods described herein. For example, the solvent composition may change in-line during a 3D printing process. In other approaches, a graded product may be formed by casting layers of different compositions (e.g., by modifying the oligomer and/or solvent concentrations) on top of one another. For example, an aerogel may comprise at least two layers (e.g., regions) where a first layer is relatively less transparent, and a second layer is relatively more transparent. An aerogel may comprise any number of layers, the layers having any variation in transparency. For example, an aerogel may comprise alternating layers having more transparency and less transparency. The similarity in materials in such a layered product would result in strong bonding between the layers, as would be understood by one having ordinary skill in the art.

In some approaches, the aerogel itself is a product. Moreover, in other approaches, the aerogel may be combined with other components to create many types of products, such as those described elsewhere herein.

Experimental

Figure 2:
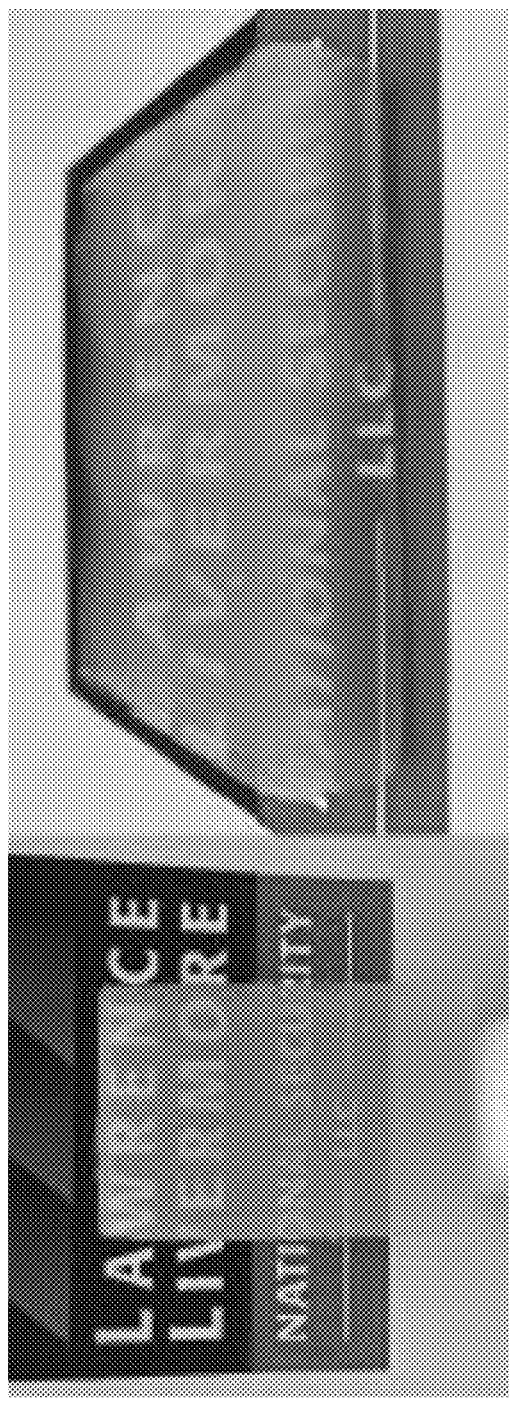
FIG. 2 is an image of a transparent aerogel, in accordance with one aspect of the present invention.

FIG. 2 is an image of an exemplary transparent aerogel having dimensions of 2 inches×3 inches and a thickness of 1.2 cm.

Figure 3:
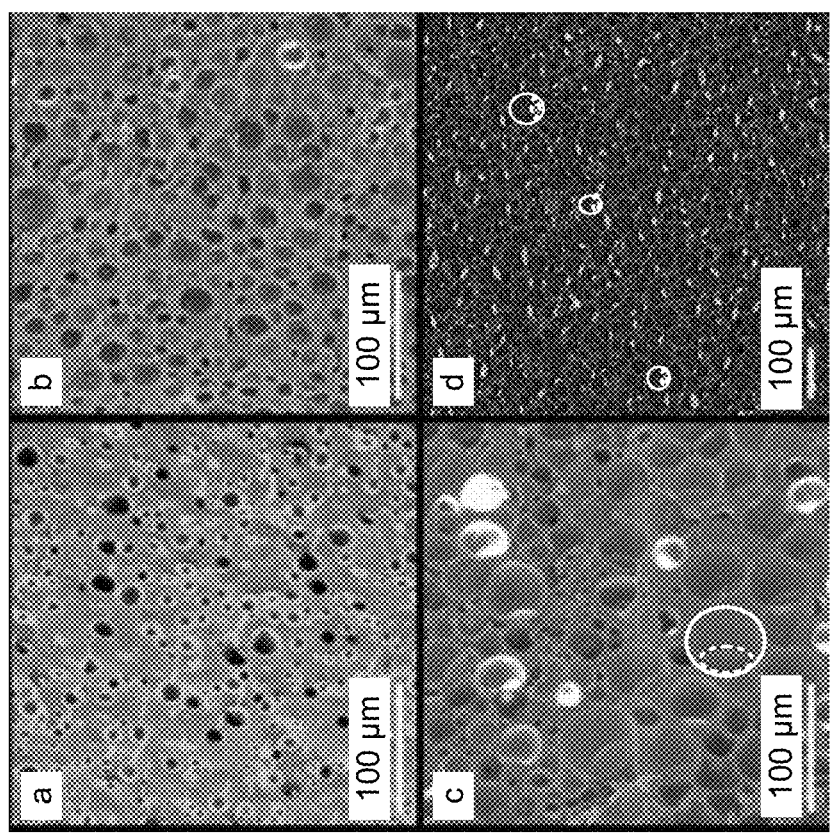
FIG. 3 includes images of exemplary polyimide aerogels with induced hierarchical porosity, in accordance with one aspect of the present invention.

FIG. 3 includes images of the microstructure of PI aerogels made opaque through the partial replacement of the NMP solvent with high molecular weight polystyrene (PS). An SEM image of a PI aerogel made with 1 wt % PS is shown in portion (a), an SEM image of a PI aerogel made with 5 wt % PS is shown in portion (b), and an SEM image of a PI aerogel made with 10 wt % PS is shown in portion (c). A reconstructed slice from x-ray computed tomography of a PI aerogel made with 10 wt % PS is shown in portion (d). Exemplary voids are outlined in solid white in portions (c) and (d). Due to the fine pore structure, unlike relatively smaller solvent molecules, the high molecular weight PS (outlined in dotted white in portions (c) and (d)) is unable to pass through the porous void walls during solvent exchange and supercritical drying and becomes trapped in the spherical voids.

2,2'-Dimethyl-4,4'-diaminobiphenyl 98.0% (DMBZ), and 3,3',4,4'-Benzophenonetetracarboxylic dianhydride ≥96.0 (BPDA) were purchased from TCI. BPDA was used immediately once purchased, since discoloration in the starting material affects aerogel formation and results in a darker yellow PI aerogel. Melamine 99% was purchased from Across Organics. Pyridine, N-methyl-2-pyrrolidone (NMP) and acetic anhydride were purchased from VWR. All materials have been used as received.

A suite of complementary techniques was used to analyze the microstructures of the aerogels as a function of solvent concentration, crosslink density, and acetic anhydride's role in gelation. Local features were captured by scanning electron microscopy (SEM) and transmission electron microscopy (TEM) to complement the bulk-average distribution measured by small angle X-ray scattering (SAXS). Brunauer-Emmett-Teller (BET) surface area analysis was measured via $N_2$ porosimetry. Mechanical properties were measured via uniaxial compression. Transparency was measured by UV-Vis transmission. Chemical properties were monitored by 1H MAS NMR (Nuclear Magnetic Response).

The compressive modulus of the aerogels was tested on monolithic 1×1 cm cubes and 1×1 cm cylinders using an Instron model 5966. The samples were compressed dimensionally with a 10 kN load cell at 0.05 in/min (1.27 mm/min), as per ASTM standard D695-10. PI aerogels with 1:2 ratios of diameter tend to buckle during compression, so 1:1 ratio of diameter aerogel samples were used for all compression testing.

Samples were taken from both compressed and uncompressed aerogels. The measurements were done on a 400 MHz Neo system using a 4 mm probe and spun at 12 kHz. Both direct and cross polarization were collected with proton decoupling.

Scanning electron microscopy (SEM) images were obtained on a JEOL 7401-F scanning electron microscope at 20 kV accelerating voltage. Samples were split in the middle and then sputter coated with ~10 nm of carbon or gold films to reduce charging and mounted on an aluminum stub using carbon tape.

Transmission electron microscopy (TEM) images were obtained on an FEI Titan G2 S/TEM operated at 300 kV accelerating voltage and using a 40 µm objective aperture. Sample drift was observed during imaging of the fibers due to sample charging but was within acceptable ranges. Drift effects were minimized by using low exposure times during imaging. Images were taken in a slightly under-focused condition to enhance contrast at the edges of the amorphous polymer fibers relative to background, Images were processed using Digital Micrograph and Fiji/ImageJ software.

For thermogravimetric analysis (TGA), thermal stability measurements were performed on a TA Instruments SDT-650 TGA/DSC system. The mass of the sample was recorded as the temperature was increased from 30° C. to 500° C. at 5° C./min under a flow of UHP $N_2$.

Transmission measurements were conducted on a Perkin Elmer Lambda 950 with integrating sphere. UV-Vis analysis was conducted on 3 mm thick disks.

The samples were outgassed at 100° C. for 4 hours under vacuum before running $N_2$—adsorption porosimetry with an ASAP 2000 Surface Area/Pore Distribution analyzer (Micromeritics Instrument Corp.).

The morphology within each PI aerogel was resolved using small angle X-ray scattering (SAXS). SAXS measures the scattered intensity as a function of angle of measurement, θ, to generate a plot of the intensity, I, versus the magnitude of the scattering vector, q, which is defined by the equation:

$$q = 4\pi \frac{\sin\left(\frac{\theta}{2}\right)}{\lambda}$$

where λ is the wavelength of the X-rays, which was 1.54 A (Cu-kα). Each of the 3 mm thick samples were placed on a sample holder within a Xeuss 3.0 USAXS/SAXS/WAXS instrument (Xenocs). The samples were measured under vacuum first using a Bonse-Hart setup to collect the ultra-small angle X-ray scattering (USAXS), which was used to reveal any heterogeneities on the length scales between 0.1 µm to 1 µm. The data is slit-smeared (0.1 Å$^{-1}$) and the USAXS data is difficult to merge with the high-q SAXS data; this is due to unique scattering features that are present in the vicinity of the slit-length. Two different camera distances were used to obtain SAXS data using a Pilatus 3R detector. All SAXS data shown here were reduced and q-calibrated using the Nika package x and the absolute intensity calibration was performed by measuring a glassy carbon sample of known scattering cross-section to obtain the calibration factor for all data sets.

Experimental: Fabrication of PI Aero Gels

Monolithic transparent aerogels were fabricated with total solid concentrations in the range of 132 mg/mL (e.g., 13 wt %). All the aerogels were prepared with a 1:0.8 ratio of BPDA:DMBZ and a minimum of 0.01 equivalent of melamine. The PI formulation herein is reported as 0.8:1.0:X:7:Y in reference to the ratio of DMBZ:BPDA:Melamine:Pyridine:Acetic Anhydride. In a typical gel preparation, DMBZ was fully dissolved in NMP before the addition of BPDA and mixed for 1-7 minutes, depending on polymer concentration—longer mixing times were necessary for higher monomer concentrations. To fully crosslink the formed oligomer, the triamine crosslinker (melamine) was then added and mixed for 3 minutes. The mixture was then chemically imidized by the addition of acetic anhydride (AA) and a weak base (pyridine), initiating gelation. This solution was mixed for 1-5 minutes, depending on gelation time (the point at which the mixture no longer flows), before molding to ensure gel homogeneity. Gels with higher density and/or higher crosslink density were viscous and required mechanical mixing (THINKY planetary mixer) to prevent macroscopic inhomogeneities which appear as swirls in the final aerogels.

After imidization, the gels were molded in glass tubes or silicone rubber sandwiched between glass slides to minimize solvent evaporation. Multiple molds were used, depending on the desired shape. Specifically, 1 cm×1 cm cylindrical and square glass tubes (AdValue Technology) were used to produce samples for compression testing and density measurements, respectively. Discs were produced for transparency and thermal conductivity measurements by punching 1 cm diameter holes in 3 mm thick silicone rubber. All syntheses were performed at ambient pressures and temperatures with atmospheric exposure. Molded gels were aged for 24 hours to ensure complete gelation.

Gels were then demolded and underwent a solvent exchange in preparation for supercritical drying. First, PI gels are submersed and washed two times in an NMP bath for 24 hours to remove unreacted monomers and excess AA. Subsequently, the gels were transferred to an NMP-acetone mixture (1:1) to gradually change solvent polarity and avoid pore collapse, then followed with 4×24 hour exchanges in acetone to remove residual NMP. Finally, the samples were dried in a supercritical CO2 dryer (EMS 3100) according to standard procedures. Less than 10% shrinkage was observed during this drying process as reported later for various gel formulation.

Experimental Results

Variations in melamine concentration, polymer concentration, solvent composition, and acetic anhydride mole ratio were investigated to monitor their influence on bulk density, Young's modulus, opacity, and gelation time. The polyimide aerogels were synthesized with a constant ratio of 1:0.8 BPDA:DMBZ, with a standard 0.03 mole equiv. melamine, 7 mole equiv. pyridine, 6 mole equiv. AA with a total monomer concentration of 132 mg/ml NMP. The fine-featured materials show low light scattering with 95% transparency including losses from surface reflections. This also provides a high surface area measured by nitrogen sorption using the Brunauer-Emmet-Teller (BET=794.05 m$^2$/g), higher than their Si aerogels counterparts (BET=595-749 m$^2$/g). The fully conjugated backbone provided a high strain ranges from $E_o$=473 kPa with density of 0.087 g/cc. The aromatic PI backbone also possessed a thermal conductivity of 38.64 mW/mK comparable to fire retardant insulation materials at 24-25 mW/mK and high thermal decomposition temperature at 430° C.

Firstly, individual impacts of modifying crosslinking melamine concentration and overall polymer concentration on aerogel density were investigated. To chemically vary the density, systematic study of the variation of crosslinker shown in the table of FIG. 4, shows the increase of the crosslinker (0.01-0.10 mole equiv.) leads to increase in aerogel density (0.0791 g/cc to 0.0866 g/cc), yielding a higher Young's modulus ranging from 281 kPa to 539 kPa. As expected, mechanical property of PI depended on the porosity and relative density with increased density corresponding to increased overall modulus. However, increased crosslinking density did not affect feature size measured by small angle scattering (SAX) and BET measurements (616 m$^2$/g-638 m$^2$/g) respectively. The change in crosslinker in the PI aerogel formulation showed a slight increase in glass transition temperature of 420° C.-450° C. with no effect on transparency or BET surface area with 91%-94% transparency and 616 m$^2$/g-794 m$^2$/g. This is due to chemical change in the PI fibers without any physical changes to the submicron morphology of the fiber during gelation which minimizes the change in surface area, pore size and transparency. Solubility of the triamine was limited to 0.10 mole equiv. After 3 hours of stirring higher concentrations of the melamine crosslinker in the oligomer solution, undissolved particulates were still visible on the bottom of the flask. Increasing the crosslinker concentration above 0.10 mole equiv. showed a reduction in density and modulus due to the solubility limitation in the oligomer mixture.

Changes in the polymer concentration affect the bulk density, Young's modulus, opacity, and gelation time of aerogels. A 0.8:1.0:0.3:7:6 formulation with a constant crosslinker concentration of 0.3 molar equivalents was used. By varying the polymer concentration from 92 mg/ml to 265 mg/ml, as shown in the table of FIG. 5, there was an increase in measured density from 0.0663 g/cm$^3$ to 0.15 g/cm$^3$. An increase in polymer concentration also increased Young's modulus values, from 312 kPa to 1.78 MPa (linear fit 0.94 R$^2$), as well as increasing yield stresses from 12 kPa up to 25 kPa. However, the polymer concentration was observed to have minimal effect on aerogel transparency, which held constant above 90% transparency, and surface area above 660 m$^2$/g. Aerogels with lower polymer concentrations showed longer gelation times and more homogeneous porosities compared to the higher concentration formulations. When polymer concentration exceeded 265 mg/ml, the high viscosity of the mixture resulted in poor mixing, causing fast gelation times of less than 1 minute and yielding inhomogeneous aerogels. These inhomogeneous aerogels showed swirls and inconsistent lines within the dried foam which caused large variations in mechanical properties and transparency measurements within a sample.

To monitor the impact of density variation due to crosslinker variation and polymer concentration, a series of compression tests was performed on 1×1 cm mold PI gels. The compression results of the transparent aerogels showed modulus between 280 KPa and 1.25 MPa, and yield strengths between 5 and 25 kPa. For the exemplary PI aerogel formulation, the measured density is 0.0874±0.0026 g/cc with an elastic modulus of $E_o$=472.70 kPa. The stress-strain curves of all the PI aerogels show similar deformation stages, starting with a linear elastic region of less than 0.4% strain due to the blending of the structural foundations and the submicron featured ligaments of the structure. The linear elastic region is followed by the plastic region, characterized by the plateau feature ending 95% strain due to the collapse of internal aerogel pores. Due to the high porosity of the PI aerogels, no bulging or deformation in the x,y dimension was observed after full compression. Changes in measured density also affect the yield stress after 0.02 strain leading to a higher plastic region with higher crosslinking melamine. The solubility of the triamine was limited to 0.10 mole equiv. and led to maximum the modulus at 0.05 mole equiv. and the modulus decreased once again at 0.1 mole equiv. melamine.

In general, when comparing various aerogel density formulations, Young's modulus decreased with decreasing density, which is associated to decreasing NMP concentration or increasing crosslinker. This relationship is representative of the logarithmic time scale Ashby chart producing a linear fit ($R^2$=0.9132) and power law of 2.13 in density and modulus for all the collected data. Moreover, the submicron feature of both fiber and pore reduces light scattering, consequential yielding an optically transparent aerogel. Various formulations in 100% NMP of 3 mm PI aerogel disks showed high transparencies in the visible region (540 nm-790 nm). However, the gel showed a color cut-off at 490 nm for blue absorbance characteristic to the PI yellow coloration. The change in density would only affect aerogel mechanical properties while keeping transparency characteristics within 95-90% range.

When varying the solvent composition with different ratios of polar and nonpolar solvent, the PI chemical formulation was constant at 0.03 mole equiv. melamine and 132 mg/ml polymer concentration. PIs were formed with increasing amounts of the "bad," nonpolar solvent toluene at 0%, 10%, 25%, and 50% volume in NMP. PIs formed with more than 50% toluene showed immediate phase separation during formation, with the polymer in the bottom NMP layer. The table shown in FIG. 6 includes the physical and mechanical properties of PI aerogels formed with these different solvent compositions. Increasing the amount of toluene in the solvent resulted in increased measured densities of the PI aerogels, up from 0.087 g/cm³ to 0.10 g/cm³. PIs formed with less toluene also exhibited extreme increases in opacity. The total transmission of aerogels formed in 50% toluene, as measured by UV-Vis, was less than 35% light transmission. There was a linear increase in transmission with decreasing toluene content and correspondingly more NMP content, up to fully ~95% total transmission in 100% NMP PI aerogel formulations. Additionally, the higher density of aerogels formed with more nonpolar solvent also changed the mechanical stress-strain properties of the aerogels as demonstrated by the dramatic decrease in Young's modulus at 10% toluene versus 0% toluene, followed by an increase in Young's modulus with increasing density and toluene content. While density is effectively unchanged from pure NMP and 10% toluene (0.086 g/cm³ and 0.088 g/cm³), however, the physical and mechanical properties showed an immediate decrease in surface area, transmission, and drastic decrease in modulus. This is due to the phase separation accrued in the presence of toluene that causes larger porosity and variation in pore morphology.

Figure 7:
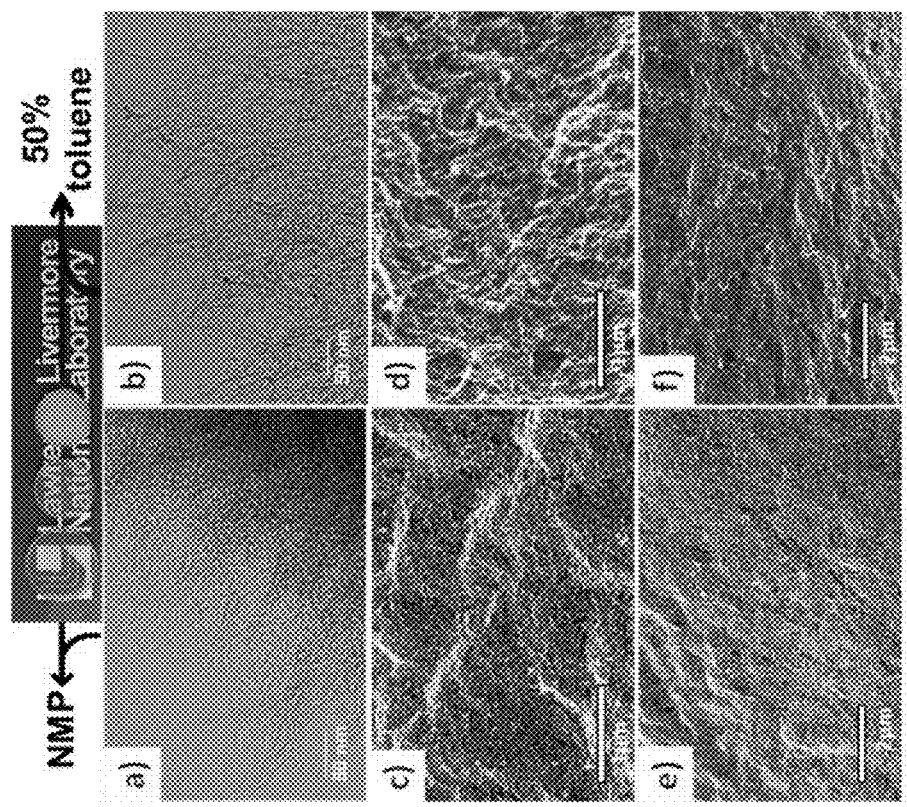
FIG. 7 includes transmission electron microscopy (TEM) images and scanning electron microscopy (SEM) images of exemplary polyimide aerogels, in accordance with one aspect of the present invention.

The combination of the TEM and SEM techniques highlight the similar fibrous strands but different pore morphology of the homogeneous and heterogeneous solvent systems. Both formulation with pure NMP and mixture of 50% toluene showed similar fiber morphologies, as shown in the TEM images in FIG. 7 portion (a) and (b). TEM imaging showed identical morphologies of the individual fibers with small dimensions between 8.6±2.6 nm for PI aerogels made from polar solvents and polar-nonpolar mixtures. The distance that spans from one fiber to the next is difficult to resolve in a 2D projection however, it could be proximate at a two times smaller dimension than the fiber diameter. While SEM does not resolve individual fibers strands, it provides insightful information on the pore morphology that was lacking in TEM images. SEM imaging of the interior section of PIs at 50× magnification shown FIG. 7 portion (c) and (d) show a difference in the morphology of pores from aerogels formed with pure NMP compared to those formed with 50% toluene. Specifically, the presence of voids is only noticeable in PI aerogels made from the mixed solvent system as shown in FIG. 7 portion (e) and (f). The SEM images at lower magnification also show the aggregation, or bundling, of polymer fibers in aerogels fabricated in mixed solvent systems but not in pure NMP. In the mixed solvent system, aerogels undergo shrinkage and syneresis prior to solvent exchange due to the reduced polymer-solvent affinity. While both systems experienced measurable shrinkage after solvent exchange and supercritical drying, PI aerogels fabricated from the less-polar solvent mixture underwent the most shrinkage (up to 24%). This is also shown in the chemical thermal conductivities slight increase from 38.848±8.28×10$^{-5}$ to a maximum of 45.87±1.6079×10$^{-4}$ mW/mK, and constant thermal decomposition of glass transition temperature at 437° C., indicating that the chemical structure of the PI backbone is not affected by the solvent modification.

The higher aggregation of PI fibrous strand, solvent phase separation, and PI gel syneresis during gelation in toluene PI aerogels are further reflected by the decrease in internal surface area from 794 m²/g to 592 m²/g.

In order to extract the size and volume fraction of the ligaments and pores, a scattering model was fit to all of the SAXS data in the q-range 0.006 Å$^{-1}$<q<1.5 Å$^{-1}$. Based on the TEM imaging, the solid ligaments are prolate in shape with 5 nm dimensions and aspect ratios typically greater than five. In addition to the scattering from ligaments and pores, two diffraction peaks were observed in all the data, having peak positions, $q_1$ and $q_2$ of 0.640 Å and 1.255 Å, respectively; these positions correspond to d-spacings of 9.82 Å and 5.01 Å, respectively. Each peak was modeled by a normalized gaussian function, $K_i G_i(q_i,\sigma_i)$, which has three parameters: $k_i$, $q_i$ and $\sigma_i$. Neither the peak positions nor their relative widths ($\sigma_1$ and $\sigma_2$) varied outside of the fit uncertainty from sample to sample and therefore $q_1$, $q_2$, $\sigma_1$ and $\sigma_2$ were held constant at 0.640 Å, 1.255 Å, 0.1 Å and 0.2 Å, respectively. Only the intensity scaling, $k_1$ and $k_2$, of each peak were fit to the data. Therefore, the SAXS model fit to the data contained scattering from polyimide morphology, $I_{PI}(q)$, two diffraction peaks ($G_1$ and $G_2$), and a flat background, $b_g$:

$$I_{model}(q)=I_{PI}(q)+k_1 G(q_1,\sigma_1,q)+k_2 G(q_2,\sigma_2,q)+b_g$$

In addition to the 3 fit parameters for the two Gaussian peaks and background, the scattering from the nanoscale aerogel morphology, $I_{PI}(q)$, was modelled. The inventors interpret the data as follows: the simplest scattering model with the fewest fit parameters and lowest $\chi^2$ values assumes the ligaments have a parallelepiped shape and a distribution of center-to-center distances, $\bar{d}$, that represent the pore size.

The model is given by the equation:

$$I_{PI}(q)=v_{PI}[1-v_{PI}][\rho_{PI}-\rho_{pore}]^2 S(q,d,\sigma_d)\Sigma P_V(\bar{A},\sigma)[A^3 bc]F^2(q,A,b,c)\Delta A$$

where each ligament is defined by A, the smallest dimension, and the aspect ratios of the second-dimension and third-dimension b and c, respectively; by convention c >b >1. To account for the polydispersity, a Gaussian function was used to estimate the volume distribution, $P_v$, which is defined by the mean, smallest-dimension, $\bar{A}$, and standard deviation, $\sigma$. The square of the form factor, $F^2$, for each parallelepiped is obtained by isotropic integration and using Bessel function of the first kind and zero order, $J_0$; this function is also known as the "sinc" function. The structure factor, S(q,d,σ) is necessary to fit the broad, low-q peak in the data, which is interpreted as distribution of center-to-center distances. The mean distance, $\bar{d}$, and root-mean-square, $\sigma_d$, represent the distances between the ligaments in the A and B directions. To a first approximation, the mean pore dimension, $L_p$, is extracted from $\bar{d}$, A and b by the relationship:

$$L_p = \frac{2\bar{d} - A[1+b]}{2}$$

where it is assumed that B and A faces surround the pore with equal probability. In total, 7 fit parameters associated with the bulk nanoscale heterogeneities, $I_{PI}(q)$, and 3 parameters associated with the sub-nm XRD, and background were fit using the lmfit package for python. The parameters obtained from the model fitting are plotted vs the estimated volume fraction of polyimide within each sample, $v_{est}$, is obtained from the density measurements of each sample, $\rho_A$, by the equation:

$$v_{est} \approx \frac{\rho_A}{\rho_{PI}}$$

where a value of 1.5 g cm$^{-3}$ is used for the density of pure polyimide, $\rho_{PI}$. In this way, the SAXS results are compared with bulk density measurements.

From the SAXS modelling, the synthesis approach used here resulted in ligaments with smallest dimensions≈3 nm. The second dimension is typically a factor of 2 larger and well outside of the minimum/maximum values observed. The feature in the SAXS data that is unique to a parallel-epiped is the intensity decay at q>0.1 Å$^{-1}$, which decays steeper than a Porod decay until q≈0.2 Å$^{-1}$, where a faint knee-like feature and subsequent Porod decay are observed. It is in this region that a simple cylinder form-factor fails to describe the data. The observation of two different smaller dimensions may be attributed to either stacking effects, such as junction points where ligaments overlap or anisotropic assembly perpendicular to the length of the PI. Nevertheless, the two dimensions are consistent with the dimensions observed by TEM (see FIG. 7 portion (a) and (b)). The change in pore morphology also is captured by the feature size of 700 nm measured with USAXS. It is only with 50% toluene that such large features can be observed in the USAXS region. Most information about the aerogel morphology is contained at q values >0.005 Å$^{-1}$.

While, the pore size does change with density, the normalized standard deviation, $\sigma/\bar{A}$ is constant. Therefore, there is no trend in the size of the ligaments perpendicular to the c-direction (length) or the stacking heterogeneity that results in a size distribution of pores changes with density.

Increasing polar solvent concentration from 10% to 25% to 50% toluene yielded $E_o$=276 kPa, 600 kPa, 737 kPa, respectively. Only the sample prepared with 50% toluene contains a scattering feature at low-q that has dimensions of ≈700 nm, assuming a spherical shape. The composition and volume fraction of these phases cannot be uniquely determined from the USAXS data. However, the large length scale is consistent with the opacity of this sample, whereas no such large-scale heterogeneity is observed with lower concentrations of toluene. In all cases, a Guinier region is observed starting at q≈0.01 Å$^{-1}$. The relative scale of the scattered intensity in this region decreases with decreasing density, suggesting that the scattering from the ligaments dominates this q-range.

In general, PI aerogels minimize syneresis due to the high concentration of favorable polar aprotic solve, subsequently minimizing shrinkage of the wet gel to 0%-10% after gelation. The linear oligomer prior to gelation favors polar aprotic solvents such as NMP which minimize intramolecular interaction of the oligomer, preventing phase separation between the polymer and solvent prior to gelation, at which point the percolating polymer becomes immobile. Phase separation, as a result of imidization, drives the formation of the rigid gel network, but by maximizing polymer-solvent interactions that phase separation remains local, resulting in a network of single small, well-separated fibers, rather than larger bundles or non-fibrous aggregates. By maximizing separation of the fibers in the random pore network, the (volumetric) pore size distribution is minimized, consequently minimizing light scattering, resulting the extremely transparent gels obtained in this study. Introducing a non-polar solvent such toluene can induce phase separation which forms larger pores during gelation and dramatically affects the resulting opacity. Two general types of phase separation can occur in this system: phase separation of the polymer from solution (solvent-solvent affinity >solvent-polymer affinity) and phase separation of one solvent from solution (solvent-polymer affinity >solvent-solvent affinity). Phase separation of the polymer (prior to gelation) tends to result in the coagulated polymer structures typical in polymeric aerogels, while phase separation of solvents tends to result in well-defined polymer-free voids. Evidence of both effects can be seen. The slight increase in ligament size indicates polymer aggregation, though since the BET surface area does not drastically change, this effect is limited under these conditions. As can be seen in SEM, large spheroidal voids form in gels made with toluene, attributed to phase separation of toluene from the polar NMP-polymer phase, forming polymer-free droplets in the gel. The large resulting pores are likely the primary source of optical scattering (opacity). Furthermore, a fully conjugated, highly rigid polymer network also minimizes the ability of the polymer to coagulate and form the classical semi-spherical primary/secondary particles formation seen in other polymer aerogels.

To control gelation time, acetic anhydride (AA) is an active parameter in the lower concentration formulations but not in the higher polymer concentration formulation as that effect is dominated by the polymer concentration. Higher AA will speed up the final condensation step, trapping the solvent within the pores and minimizing shrinkage. In the higher concentration PI aerogel (132 mg/ml), increasing acetic anhydride above 6 mole equivalents showed no effect on gelation time, transparency, or modulus. Higher concentration gels tend to gel within 30 minutes. However, at concentrations lower than 6 mole equivalents, PI showed longer gelation time with same mechanical properties. At lower polymer concentrations (92 mg/ml), increasing acetic anhydride sped up the final imidization dramatically, and hence sped up gelation time from 100 hours at 6 equivalents to 40 hours at 14 equivalents. SAX data also supports the inventors' interpretation of these behaviors, as the increase of acetic anhydride forced faster gelation leading to pore size decrease without changing ligament size. Increasing the base catalyst, pyridine, had no effect on gelation time or the physical and mechanical properties of the aerogels.

High density PI aerogels are a result of three aspects: higher polymer concentration using a strong polar solvent, higher chemical crosslinker using higher triamine, and phase separation during gelation due to the addition of nonpolar cosolvents such as toluene. Each of those parameters will affect gel formation and the resulting modulus, pore morphology, and transparency. With a limitation in triamine solubility, the crosslinker only affected chemical structure of the PI fibers, causing slight increase in density and $T_g$. However, the increase in polymer concentrations showed similar behaviors with drastically increasing density, pore morphology and modulus. However, transparency stayed above 90% due to the small features.

In the higher nonpolar solvent formulation, PI aerogels density is affected mainly by syneresis due to the various concentrations of favorable polar aprotic solvent, subsequently changing the pore morphology. Introducing more nonpolar solvent such as toluene induces phase separation that forms larger pore sizes up to 700 nm voids, causing higher shrinkage and syneresis during gelation and increased light scattering resulting in opacity. Samples with higher nonpolar solvent concentrations showed increased shrinkage and led to more opaque PI gels with higher density. High shrinkage percentage suggests the collapse of pores with higher aggregation events within the polymeric system. As a result, the PI aerogels exhibit higher density with lower porosity and reduced transparency from 95% to 36%. This was validated by SAX and USAX measurements showing a pore size void only in 50% toluene formulation.

Experimental: Fabrication of Aero Gel Foams
Procedure A:

To prepare a transparent polyimide aerogel at 0.49 mM (14 wt %) concentration (FIG. 4, entry 3), first DMBZ (315 mg, 1.49 mmol) was added to 7 mL of NMP at room temperature and stirred at 370 rpm for 5 minutes until it was completely dissolved resulting on white to clear solution. BPDA (600 mg, 1.87 mmol) was then added and stirred for 7 minutes. The reaction mixture turned a light salmon color upon BPDA addition and transitioned to a clear yellow within 1 minute. After stirring for 7 minutes, the melamine (7.9 mg, 0.06 mmol) was added to the DMBZ-BPDA oligomer solution and stirred for 15 minutes to ensure homogeneous mixing. Acetic anhydride (AA) (1 mL) and pyridine (1 mL) were then added in sequence while continuing to stir to form a deeper intense yellow colored solution. The resulting cross-linked polyimide solution was pipetted into various molds after 5 minutes of stirring and allowed to gel for 24 hours. Gelation time was monitored and recorded for each reaction.

Procedure B:

To prepare a transparent polyimide aerogel at 0.98 mM (27 wt %) concentration (FIG. 5, entry 10), DMBZ (789.5 mg, 3.72 mmol) was first added to 8.7 mL of NMP at room temperature and stirred at 2000 rpm for 1 minute using a mechanical stirrer (THINKY) resulting in a white to clear solution. BPDA (1.5 g, 4.66 mmol) was then added and mixed for 1.5 minutes. The reaction mixture was a clear yellow once it was removed from the mechanical stirrer. The melamine (17.6 mg, 0.14 mmol) was subsequently added to the DMBZ-BPDA oligomer solution and mixed for 1 minute until homogeneous. Acetic anhydride (AA) (1 mL) and pyridine (1 mL) were added in sequence while continuing to stir for 1 minute. The resulting cross-linked polyimide yellow solution was pipetted into various molds and allowed to gel for 24 hours. Gelation time was monitored and recorded for each reaction. The preparation of opaque polyimide aerogels (FIG. 6, entries 11-13) followed the procedure A except that toluene was mixed with NMP in the desire ratio and used in place of pure NMP as the reaction solvent.

The reported solvent volumes above represent the total volume of both NMP and toluene. Higher concentrations of toluene (>50%) were attempted, but DMBZ and BPDA were both insoluble in the solvent mixture and no reaction occurred.

In Use

Transparent polymer aerogels may be used for many optical applications including window insulation, transparent solar panels, aerospace lightweight insulation, etc. In other approaches, various polymer aerogels presented herein may be used in fire retardant insulation materials due to their high thermal insulation and thermal stability.

In several aspects, the ability to tune the surface chemistry of the resulting aerogels presented herein has many broad applications due to the variety of potential chemistries which are physically characteristic of the starting polymers described herein. Applications include thermal insulation, windows (e.g., which take advantage of the transparent and thermally insulating physical characteristics of the resulting materials), catalyst supports (e.g., which take advantage of the high surface area of the materials and/or the ability to modify the surface area of the aerogel with an active chemical moiety), photo catalytic processes (e.g., which take advantage of the transparent physical characteristic and control of surface chemical moieties of the resulting materials), sacrificial energy absorption materials (e.g., bullet proof vests, crumple zones in cars, etc.), etc. For example, silica aerogels and metal oxide aerogels are limited to the specific chemistries of the silica and/or metal oxide used to form the aerogels. Furthermore, any available modification to the chemistry of conventional silica aerogels and metal oxide aerogels significantly reduces the transparency of the material.

In at least some aspects, the resulting materials formed according to at least some of the aspects described herein are relatively easy to etch compared to conventional silica aerogels. For example, silica aerogels are very difficult to degrade, and hydrofluoric acid (HF) is often used for any etching applications. HF is extremely toxic and difficult to use. In sharp contrast, the presented organic aerogel materials are more readily usable for applications involving etching the aerogels with a base or an acid.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
   a polymer aerogel, the aerogel being physically characterized by having a transparency greater than or equal to 90% transmission of visible light through a 3 mm thickness of the aerogel, wherein the aerogel comprises at least one oligomer selected from the group consisting of: a polyamide, a polyimide, a polyacrylate, a polyvinyl, and a polythioether, wherein the aerogel includes fibers, wherein an average diameter of the fibers in the aerogel is less than or equal to 10 nm.

2. The product of claim 1, wherein the aerogel includes pores, wherein an average diameter of the pores in the aerogel is less than or equal to 20 nm.

3. The product of claim 1, wherein the aerogel is characterized as having a surface area greater than 500 $m^2/g$, wherein the aerogel is characterized as having a density between about 50 $mg/cm^3$ and about 200 $mg/cm^3$.

4. A product comprising:
a polymer aerogel, the aerogel being physically characterized by having a transparency greater than or equal to 90% transmission of visible light through a 3 mm thickness of the aerogel, wherein the aerogel comprises at least one oligomer selected from the group consisting of: a polyamide, a polyimide, a polyacrylate, a polyvinyl, and a polythioether, wherein the aerogel is characterized as having a transparency gradient along at least a portion thereof.

5. The product of claim 1, wherein the aerogel comprises at least two regions, wherein a first region of the aerogel has a first transparency, wherein a second region of the aerogel has a second transparency which is different than the first transparency.

6. A product, comprising:
a polymer aerogel, the aerogel being physically characterized by having a transparency greater than or equal to 90% transmission of visible light through a 3 mm thickness of the aerogel, wherein the aerogel comprises at least one oligomer selected from the group consisting of: a polyamide, a polyimide, a polyacrylate, a polyvinyl, and a polythioether, wherein the aerogel is elastic and exhibits shape memory.

7. The product of claim 1, comprising a material selected from the group consisting of polystyrene, polyvinyl alcohol, and polyacrylonitrile.

8. The product of claim 1, comprising a material selected from the group consisting of polyurea and polybenzoxazine.

9. The product of claim 1, wherein the fibers are unimolecular.

10. The product of claim 1, wherein the aerogel has a modulus greater than or equal to 1 MPa.

11. The product of claim 1, wherein the aerogel has a thermal conductivity less than 38 mW/mK.

12. The product of claim 1, wherein the aerogel has a thermal conductivity in a range between about 38 mW/mK and about 46 mW/mK.

13. The product of claim 1, wherein the aerogel has a fully conjugated polyimide backbone.

14. The product of claim 1, wherein the aerogel has a graded composition along at least a portion thereof.

15. The product of claim 4, wherein the transparency gradient includes a transition from a relatively more transparent region to a relatively more translucent region.

16. The product of claim 4, wherein the transparency gradient is a product of different phases of the same chemical composition.

17. The product of claim 4, wherein the transparency gradient is a product of layers having a same chemical composition and different relative transparencies.

18. A method for forming the aerogel of claim 1, the method comprising:
dissolving at least one monomer in at least one solvent to form a mixture;
causing polymerization of the at least one monomer to form at least one oligomer;
causing crosslinking of the at least one oligomer;
initiating gelation of a product of the crosslinking and the at least one solvent to form an aerogel precursor; and
forming the aerogel from the aerogel precursor.

* * * * *